(12) United States Patent
Francis, Jr. et al.

(10) Patent No.: US 8,878,846 B1
(45) Date of Patent: Nov. 4, 2014

(54) SUPERIMPOSING VIRTUAL VIEWS OF 3D OBJECTS WITH LIVE IMAGES

(71) Applicant: Google Inc., Mountain View, CA (US)

(72) Inventors: Anthony Gerald Francis, Jr., San Jose, CA (US); James J. Kuffner, Jr., Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/662,675

(22) Filed: Oct. 29, 2012

(51) Int. Cl.
*G06T 17/00* (2006.01)
*G06T 19/00* (2011.01)
*G06T 17/10* (2006.01)

(52) U.S. Cl.
CPC .................................. *G06T 19/006* (2013.01); *G06T 17/10* (2013.01)
USPC .......................................... 345/420; 345/428

(58) Field of Classification Search
CPC combination set(s) only.
See application file for complete search history.

(56) References Cited

U.S. PATENT DOCUMENTS

| | | | | |
|---|---|---|---|---|
| 7,928,977 | B2 * | 4/2011 | Tanimura et al. | 345/419 |
| 2010/0066750 | A1 * | 3/2010 | Yu et al. | 345/581 |
| 2011/0221669 | A1 * | 9/2011 | Shams et al. | 345/156 |
| 2012/0069051 | A1 * | 3/2012 | Hagbi et al. | 345/633 |

OTHER PUBLICATIONS

Brostow, Gabriel J. et al, Segmentation and Recognition using Structure from Motion Point Clouds, Proceedings of the 10th European Conference on Computer Vision: Part I, pp. 44-57 (2008).
BMW Augmented Reality: Workshop applications, accessed from http://www.bmw.com/com/en/owners/service/augmented_reality_workshop_1.html on Jan. 27, 2012.
Gausemeier, Juergen et al., Development of a real time image based object recognition method for mobile AR-devices, Proceedings of the 2nd International Conference on Computer Graphics, Virtual Reality, Visualisation and Interaction in Africa, pp. 133-139 (2003).
Autodesk 123D Catch, Catch and carry, Turn ordinary photos into extraordinary 3D models, www.123dapp.com/catch, 2013.

* cited by examiner

*Primary Examiner* — Kee M Tung
*Assistant Examiner* — Leon T Cain, II
(74) *Attorney, Agent, or Firm* — McDonnell Boehnen Hulbert & Berghoff LLP

(57) ABSTRACT

Methods and systems for superimposing virtual views of 3D objects with live images are provided. An example method may include determining 3D geometry information associated with an environment using one or more sensors of a mobile device, and recognizing 3D objects in the environment based on a database of 3D objects and the 3D geometry information. The method may also include determining a field of view of the environment based on a position of the mobile device in the environment and rendering an image of one or more of the 3D objects that are within the field of view. The rendered image may have a given perspective that is based on a viewpoint position from which the mobile device is viewed. The rendered image may also be combined with a live image of the field of view that is presented by the mobile device.

22 Claims, 10 Drawing Sheets

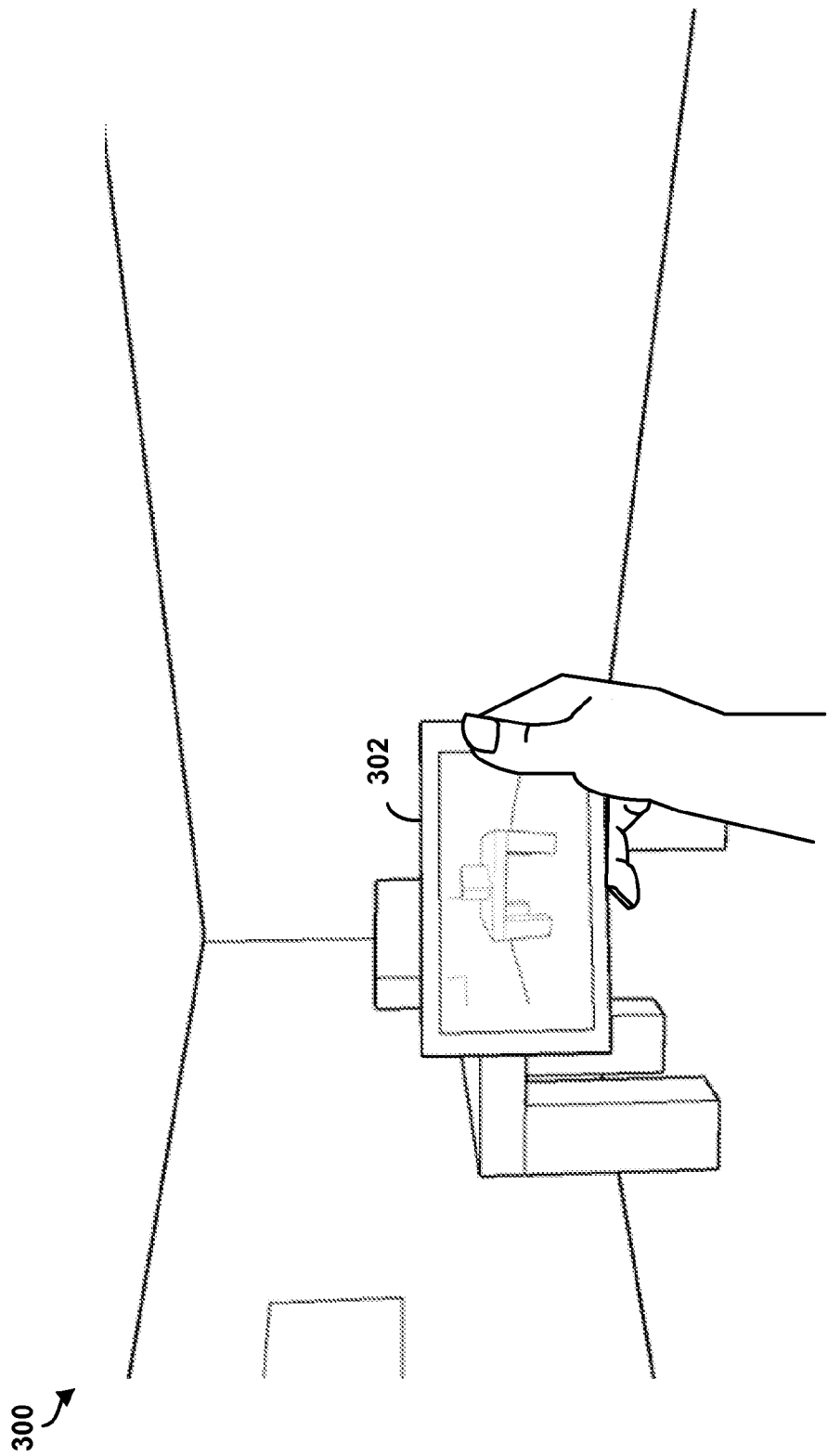

Computer Program Product 900

Signal Bearing Medium 901

Program Instructions 902

- determining three-dimensional (3D) geometry information associated with an environment using one or more sensors of a mobile device;

- recognizing 3D objects in the environment based on a database of 3D objects and the 3D geometry information;

- determining a field of view of the environment based on a position of the mobile device in the environment;

- rendering an image of one or more of the 3D objects that are within the field of view, wherein the rendered image has a given perspective that is based on a viewpoint position from which the mobile device is viewed; and

- combining the rendered image with a live image of the field of view that is presented by the mobile device.

| Computer Readable Medium 903 | Computer Recordable Medium 904 | Communications Medium 905 |

SUPERIMPOSING VIRTUAL VIEWS OF 3D OBJECTS WITH LIVE IMAGES

FIELD

This disclosure relates to detecting and rendering three-dimensional (3D) objects, and in examples, to augmented reality applications for mobile devices.

BACKGROUND

In computer graphics, three-dimensional (3D) modeling involves generation of a representation of a 3D surface of an object. The representation may be referred to as a 3D object data model, and can be rendered or displayed as a two-dimensional image via 3D rendering or displayed as a three-dimensional image. 3D object data models represent a 3D object using a collection of points in 3D space, connected by various geometric entities such as triangles, lines, curved surfaces, etc. Various techniques exist for generating 3D object data models utilizing point clouds and geometric shapes, for example.

Being a collection of data, 3D models can be created by hand, algorithmically, or based on data from objects that are scanned, for example. As an example, an artist may manually generate a 3D image of an object that can be used as the 3D model. As another example, a given object may be scanned from a number of different angles, and the scanned images can be combined to generate the 3D image of the object. As still another example, an image of an object may be used to generate a point cloud that can be algorithmically processed to generate the 3D image.

In some examples, a 3D model may be rendered on a display of a mobile device. Example mobile devices include cellular phones, tablet computers, wearable computing devices such as head-up displays, or laptop computers. In one instance, the display of the mobile device may be a live, direct or indirect view of a real-world environment, and the rendered 3D model may be used to augment the view.

SUMMARY

In one example aspect, a method is provided that comprises determining three-dimensional (3D) geometry information associated with an environment using one or more sensors of a mobile device. The method may further include recognizing 3D objects in the environment based on a database of 3D objects and the 3D geometry information. The method may also include determining a field of view of the environment based on a position of the mobile device in the environment. Additionally, an image of one or more of the 3D objects that are within the field of view may be rendered. The rendered image may have a given perspective that is based on a viewpoint position from which the mobile device is viewed. According to the method, the rendered image may be combined with a live image of the field of view that is presented by the mobile device.

In another example aspect, a non-transitory computer-readable memory having stored thereon instructions executable by a computing device to cause the computing device to perform functions is provided. The functions may comprise determining three-dimensional (3D) geometry information associated with an environment using one or more sensors of a mobile device. The functions may further include recognizing 3D objects in the environment based on a database of 3D objects and the 3D geometry information. The functions may also include determining a field of view of the environment based on a position of the mobile device in the environment. Additionally, based on the functions, an image of one or more of the 3D objects that are within the field of view may be rendered. The rendered image may have a given perspective that is based on a viewpoint position from which the mobile device is viewed. According to the functions, the rendered image may be combined with a live image of the field of view that is presented by the mobile device.

In another example aspect, a system is provided that comprises a mobile device having a display. Additionally, the system may comprise a geometry component, a recognition component, a position component, a rendering component, and a presentation component. The geometry component may be configured to determined three-dimensional (3D) geometry information associated with an environment using one or more sensors of the mobile device. The recognition component may be configured to recognize 3D objects in the environment based on a database of 3D objects and the 3D geometry information. The position component may be configured to determine a field of view of the environment based on a position of the mobile device in the environment. The rendering component may be configured to render an image of one or more of the 3D objects that are within the field of view. The rendered image may have a given perspective that is based on a viewpoint position from which the mobile device is viewed. The presentation component may be configured to combine the rendered images with a live image of the field of view that is presented by the mobile device.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 3 is an example conceptual illustration of a mobile device and an environment.

FIG. 9 is a schematic illustrating a conceptual partial view of an example computer program product that includes a computer program for executing a computer process on a computing device, arranged according to at least some embodiments presented herein.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure may disclose, inter alia, methods and systems for superimposing virtual views of three-dimensional (3D) objects with live images. In one example, portions of a live video stream of an environment presented on a mobile device may be superimposed with virtual views of 3D object models. In some instances, the superposition may enable various augmented reality applications.

As an example, a mobile device such as a cellular phone, tablet computer, wearable computing device, or other type of mobile computing device may determine 3D geometry of a scene. Additionally, a location of the mobile device within the scene as well as a scale or size of the scene may be determined. In some instances, based on the determined 3D geometry, objects in the scene may be recognized. Furthermore, 3D object models of the recognized objects may be used to render images of the recognized objects in a given orientation consistent with the scene. In one example, the rendered images may be displayed composited with a live image of the scene on the mobile device.

Given the capability to recognize objects and display images of the objects composited onto a live image presented on a mobile device, various augmented reality application are contemplated. In one instance, a user's eye position may be determined, and rendered images that are combined with the live image may be displayed in a correct orientation for the user's eye position. In another instance, virtual 3D objects may be rendered into a scene having an appropriate scale that is consistent with the scene. In yet another instance, recognized objects may be replaced with 3D models of other objects. In a further example, virtual 3D objects may interact with the recognized objects based on a physics model describing the interaction. In another example, a projector of the mobile device may be used to project a virtual 3D object onto the scene. Thus, a live image of a scene that is displayed on a mobile device may be modified to enable various augmented reality applications. The examples described herein are not meant to be limiting, and various additional applications are also possible.

Figure 1A:
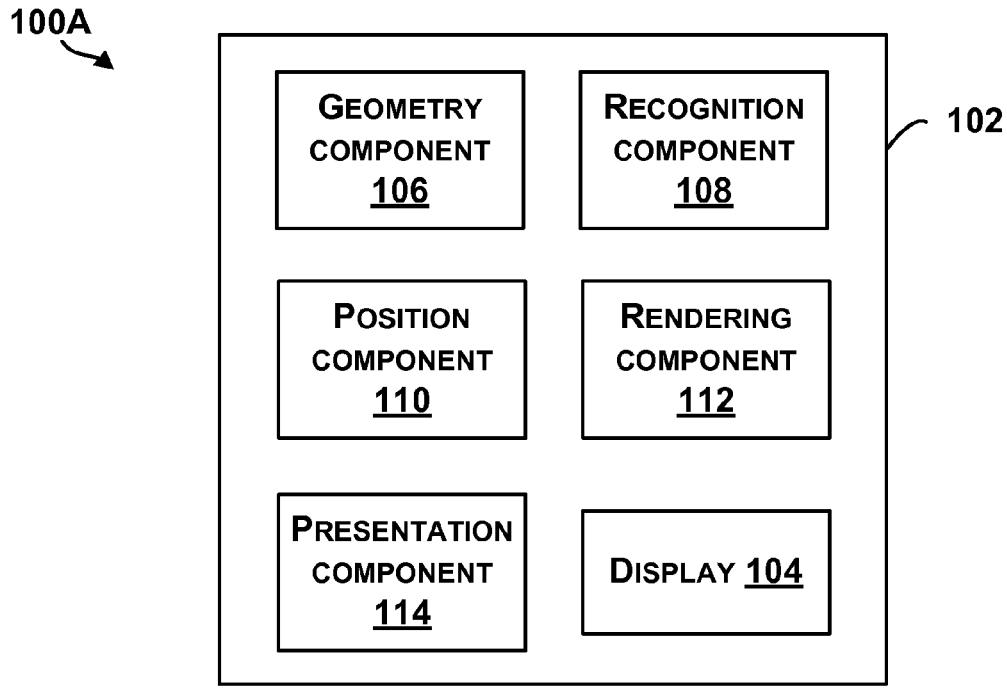
FIGS. 1A-1B illustrate example systems for superimposing virtual views of three-dimensional (3D) objects with live images.
Figure 1B:
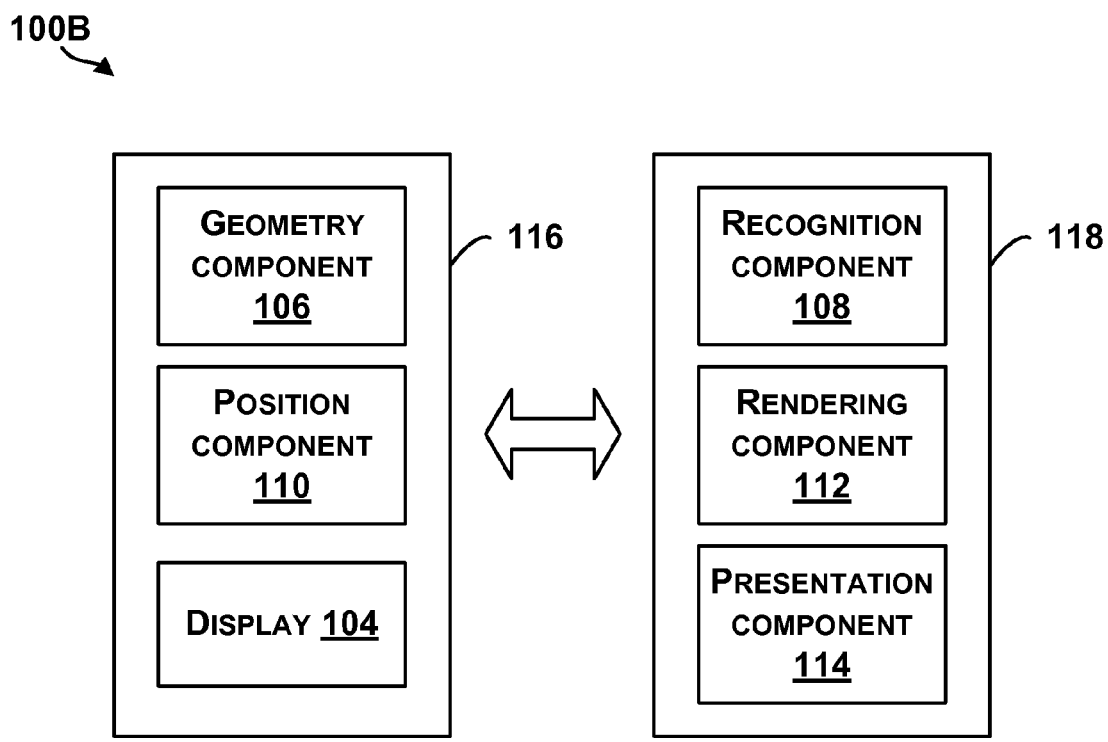

Referring now to the figures, FIGS. 1A-1B illustrate example systems 100A, 100B for superimposing virtual views of three-dimensional (3D) objects with live images. As shown in FIG. 1A, the example system 100A may be one or more components of a mobile device 102. For example, the mobile device 102 may be a mobile computing device such as a smartphone, tablet computer, laptop computer, wearable computer, etc. In one instance, the wearable computer may be a device configured to be head-mounted or wrist-mounted that includes a display 104. The mobile device 102 may be any type of mobile device having a display 104.

The display 104 may be an output device for presentation of information in visual form. The display 104 may take the form of any number of existing or future display types. The display 104 may be of any size and/or resolution. Additionally, the display 104 may be two-dimensional or three-dimensional. In some examples, the display may be a touchscreen display such as a liquid crystal display or light-emitting diode (LED) display. In other examples, the display 104 may be a head-mounted display including a display optic in front of one or more of a user's eyes.

In one example, the mobile device 102 may include a geometry component 106, a recognition component 108, a position component 110, a rendering component 112, and a presentation component 114. However, the mobile device 102 may include more or less components and any of the components may be combined or divided into other components. In one instance, one or more of the components may include software or computer readable instructions coupled to a processor and a memory and configured to perform various functions. In other instances, one or more of the components may include hardware such as sensors configured to perform various functions.

The geometry component 106 may be configured to determine 3D geometry information associated with an environment or scene. For example, the geometry component 106 may use one or more sensors such as two-dimensional and/or three-dimensional image sensors to determine 3D geometry. In one instance, the geometry component 106 may use structure-from-motion from video or still sequences, analyzing local motion signals over time to determine 3D geometry. In other instances, stereoscopic cameras or structured light projectors may be used to determine 3D geometry. In some examples, the 3D geometry information may be one or more 3D point clouds.

Based on the 3D geometry, the recognition component 108 may identify 3D objects and their associated positions in the environment. For example, the recognition component 108 may be configured to recognize 3D objects in the environment by comparing the 3D geometry information to a database or library of 3D objects. The database may be stored locally on the mobile device 102 in some examples. In other instances, the database may be a crowd-sourced database of 3D objects stored in one or more servers. In one example, the recognition component 108 may identify interest points within the 3D geometry and determine descriptors describing the interest points. The descriptors may be compared to descriptors associated with 3D objects in the database to determine and rank matches to objects in the database. Other example recognition techniques for determining 3D objects within 3D geometry information are also possible.

The position component 110 may be configured to determine a field of view of the environment based on a position of the mobile device. In one instance, the position of the mobile device 102 may be determined using information from an accelerometer or gyroscope of the mobile device 102. In other instances, the position of the mobile device 102 may be determined using a geographic positioning system (GPS) device.

In some instances, the recognition component 108 and/or the position component 110 may be used to scale the scene so that it has a known size. For example, accelerometer data or geographic positioning system (GPS) data from the mobile device 102 may be used to determine dimensions of the environment or dimensions of objects in the environment. In one example, accelerometer data or GPS data may indicate a distance which the mobile device 102 moves between a first position and a second position. Images captured from the first position and the second position may be compared to determine a size or scale of the environment based on the distance between the first position and the second position and changes in the images. In other examples, 3D objects recognized in the environment may be of a given size, and a size of a recognized object relative to dimensions of the environment may be used to determine a size or scale of the environment.

In some examples, based on the field of view and positions of recognized objects in the environment, objects within the field of view may be selected. The rendering component 112 may be configured to render images of one or more of the recognized objects within the field of view. The images may be rendered in a given orientation, size, and perspective that defines a virtual view for a 3D model and is optionally based on a viewpoint position from which the display 104 is viewed.

The viewpoint position may be an absolute position within the environment or may be determined relative to a position of the mobile device 102. For example, the viewpoint position may be determined from 3D geometry information using a front facing camera of the mobile device 102. The front facing camera or other image sensors may be used to recognize a position of a user's head. In a further instance, a position of one or more of a user's eyes may be determined relative to the position of the mobile device 102. Additionally, eye-tracking methods may be used to determine a gaze direction of the user's eyes with respect to the display 104. In one instance, a user viewing the display 104 may wear a location component, and a viewpoint position of the user's head may be determined based on a position of the location component. For example, the location component may be an accelerometer, GPS, or gyroscope that is part of a hat or cap worn by a user.

In other instances, the images of the recognized objects within the field of view may be rendered with a perspective that is based at least in part on an observation of the 3D object from the position of the mobile device. For example, the rendering component 112 may render an image of a recognized object in an orientation, perspective, and size that align with the 3D geometry information. In one instance, the 3D geometry information may have been captured from a first position and the rendering component may estimate a camera position, orientation, and size to render a 3D model of the recognized object. The 3D model may be compared with the 3D geometry information to determine whether the 3D model aligns with the 3D geometry information. In some instances, an optimization technique may be used to adjust the alignment until an error metric or distance measure between the 3D model and the 3D geometry information converges to a minimum.

In one example, the rendering component 112 may render a two-dimensional (2D) image of a virtual view of a 3D model. For instance, the 2D image may be of a virtual view having a given perspective as viewed from the position of the mobile device 102 and/or the viewpoint position from which the display 104 of the mobile device 102 is viewed. The presentation component 114 may be configured to combine one or more 2D images with a live image that is presented on the display 104. For example, the presentation component 114 may enable the rendered images to be displayed composited with the live image of the environment in real-time. In one example, a rendered 2D image of a recognized object may be superimposed over a position of the recognized object in the scene. A rendered 2D image may include a background that is transparent such that when the rendered 2D image is combined with the live image, the live image may be seen through the transparent background surrounding the 2D image.

In some examples, one or more of the components may be located in a separate computing device. As shown in FIG. 1B, the system 100B may include a mobile device 116 that is coupled to a computing device 118 via a wired or wireless connection. In one instance, the computing device 118 may be one or more servers located remotely from the mobile device 116. For instance, the mobile device may include the geometry component 106, the position component 110, and the display 104 while the computing device may include the rendering component 112, the recognition component 108, and the presentation component 114. Thus the mobile device 116 may communicate with the computing device 118 to enable a live image of a scene presented on the mobile device 116 to be superimposed with 3D objects.

Figure 2:
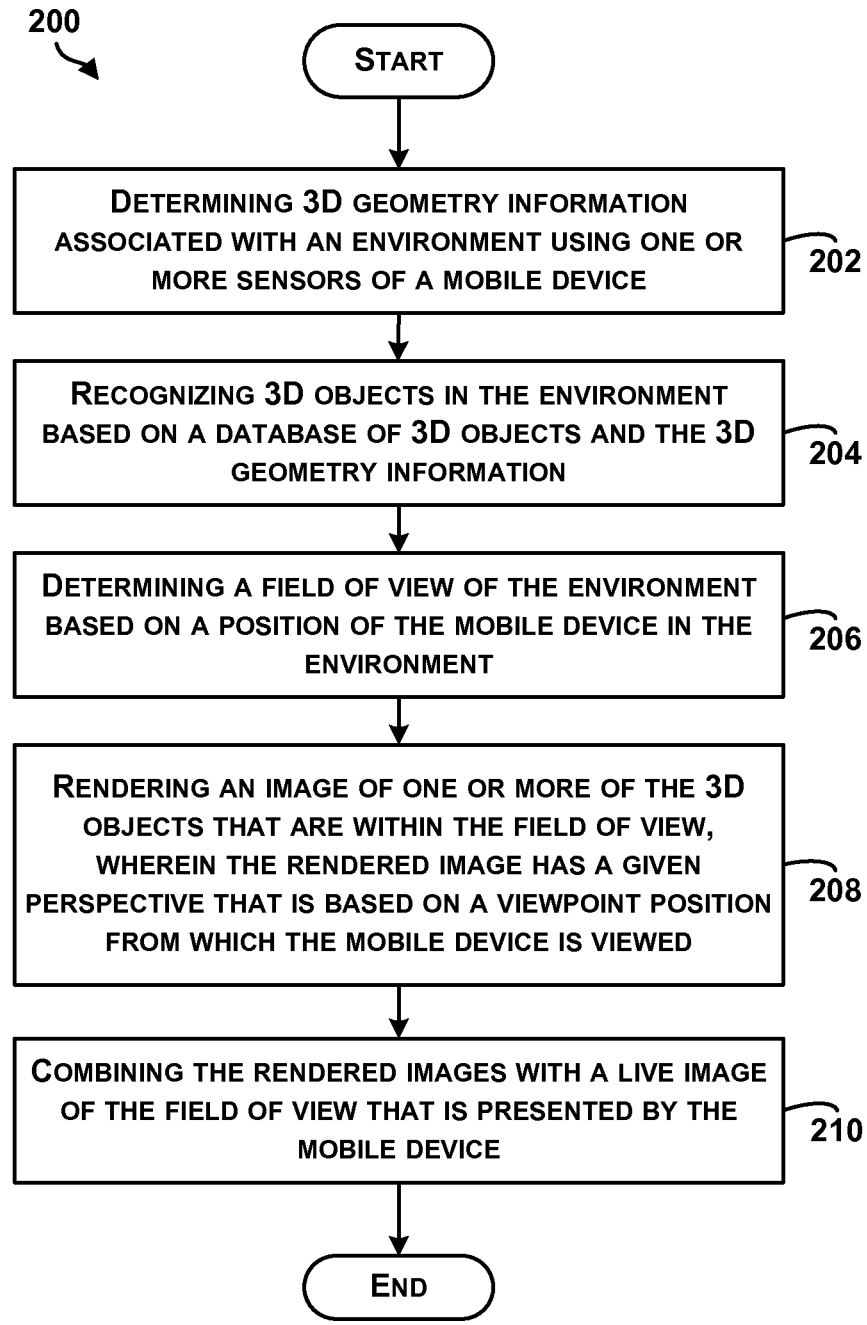
FIG. 2 is a block diagram of an example method for superimposing virtual views of three-dimensional (3D) objects with live images.

FIG. 2 is a block diagram of an example method for superimposing virtual views of three-dimensional (3D) objects with live images. Method 200 shown in FIG. 2 presents an embodiment of a method that could be used or implemented by the systems 100A, 100B of FIGS. 1A-1B, for example, or by components of the systems 100A, 100B, or more generally by a server or other computing device. Method 200 may include one or more operations, functions, or actions as illustrated by one or more of blocks 202-210. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 200 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and random access memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 200 and other processes and methods disclosed herein, each block in FIG. 2 may represent circuitry that is wired to perform the specific logical functions in the process.

Initially, at block 202, the method 200 includes determining 3D geometry information associated with an environment using one or more sensors of a mobile device. For example, a mobile device such as a phone, tablet computer, heads-up display, wearable computer, or laptop computer carried in a user's hand may scan an environment to determine 3D geometry information associated with an environment. In one example, an imaging component of the mobile device may capture video or still images of a scene, and structure-from-motion methods may be used to detect the 3D geometry of a scene. In other examples, the mobile device may use stereoscopic cameras or structured light projectors such as 3D scanners to detect 3D geometry information about an environment. The environment may be an indoor or outdoor scene and may be of any size and dimension.

Additionally, the environment may include any number of 3D objects such as blocks, furniture, computing devices, appliances, plants, trees, toys, or any type of objects. At block 204, the method 200 includes recognizing 3D objects in the environment based on a database of 3D objects and the 3D geometry information. As an example, a processor may determine interest points of the 3D geometry and descriptors describing the interest points. The descriptors may be compared to descriptors describing known 3D objects within a database. If a group of descriptors match a number of descriptors describing a given object, the group of descriptors may be recognized as an object. The processor may be a processor of the mobile device. Alternatively, the processor may be in a server to which the mobile device sends the 3D geometry information to in order to receive information describing recognized objects and associated positions of the recognized objects within the environment.

In some examples, positions of users in the environment may be recognized. For example, a user's body or part of a body such as a hand may be recognized, and a position of the recognized user may be determined.

In some instances, a lesser number of objects than a total number of objects recognized in the environment may be visible within a field of view of the environment. At block 206, the method 200 includes determining a field of view of the environment based on a position of the mobile device in the environment. As an example, based on the position of the mobile device in the environment, the field of view may be an area of inspection captured by an imaging device of the mobile device at a given orientation and position of the mobile device. In one example, a previously recognized object in the environment may not be visible based on a current field of view.

In some examples, one or more objects in an environment may be moving, and positions of the objects may be tracked in real-time based on changes in the 3D geometry information and/or changes in a position of the mobile device. For instance, motion sensors of the mobile device such as an accelerometer or gyroscope may be used to decouple or factor out motion of the mobile device from motion of objects in the 3D geometry information and determine motion of a recognized object.

At block 208, the method 200 includes rendering an image of one or more of the 3D objects that are within the field of view. Given the position of the mobile device and a position of a recognized object visible with the field of view, a 3D model of the recognized object may be rendered. The 3D model may have an orientation and size that is based on an estimated camera position for rendering the 3D model. In one example, the estimated camera position may be the position of the mobile device.

In some instances, a disparity and associated error metric between an alignment of a 3D model and the 3D geometry information may be computed. For example, the error metric may describe a distance measure between three-dimensional positions of points of the 3D model and corresponding points of the 3D geometry information. The alignment may be adjusted by adjusting the estimated camera position, rendering the 3D model again, and computing the error metric. In some instances, the alignment may be repeatedly adjusted via an optimization loop until the error metric converges to a minimum.

A 2D image of the rendered 3D model may also be rendered. In some instances, the 2D image may have a given perspective that is based on a viewpoint position from which the mobile device is viewed. At block 210, the method 200 includes combining the rendered image with a live image of the field of view that is presented by the mobile device. For example, one or more rendered images may be displayed composited with the live image of the environment in real-time.

As an example, a synthetic 2D image of a virtual view of the rendered 3D model may be rendered. In one example, a rendered synthetic 2D image of a recognized object may be superimposed over a position of the recognized object in the scene. A rendered 2D image may include a background that is transparent such that when the rendered 2D image is combined with the live image, the live image may be seen through the transparent background surrounding the 2D image.

In some examples, the rendered images may be updated in real-time or at predetermined intervals (e.g., a fraction of a second, every second, etc.) to accommodate changes in one or any combination of the position of the mobile device, the viewpoint position, and the position of the recognized object.

In one example, the synthetic 2D image may have a given perspective that is based on a viewpoint position from which a display of the mobile device is viewed. In some instances, the synthetic 2D image may be adjusted such that the synthetic 2D image has a dimensionally correct perspective when viewed from the viewpoint position. In an instance, in which an angle from the display to the viewpoint position is not normal (i.e., not perpendicular) to a surface of the display, the synthetic 2D image may be modified such that the object has a correct perspective when viewed from the viewpoint position.

FIG. 3 is an example conceptual illustration 300 of a mobile device 302 and an environment. For example, the mobile device 302 may be a tablet computer or a cellular telephone. The mobile device 302 may include a display configured to provide a live image of the environment. In some examples, a user of the mobile device may move or sweep the mobile device 302 around the environment in a predetermined or random pattern to obtain 3D geometry information associated with the environment. For example, the user may tilt or pan the mobile device up, down, left, right, forward, or back to determine information associated with the environment.

In one instance, the mobile device 302 may provide a live image on the display of the mobile device 302 after sufficient 3D geometry information has been captured for the environment. For example, one or more objects may have been recognized in the captured 3D geometry information, and a live image of the environment may be provided.

Figure 4B:
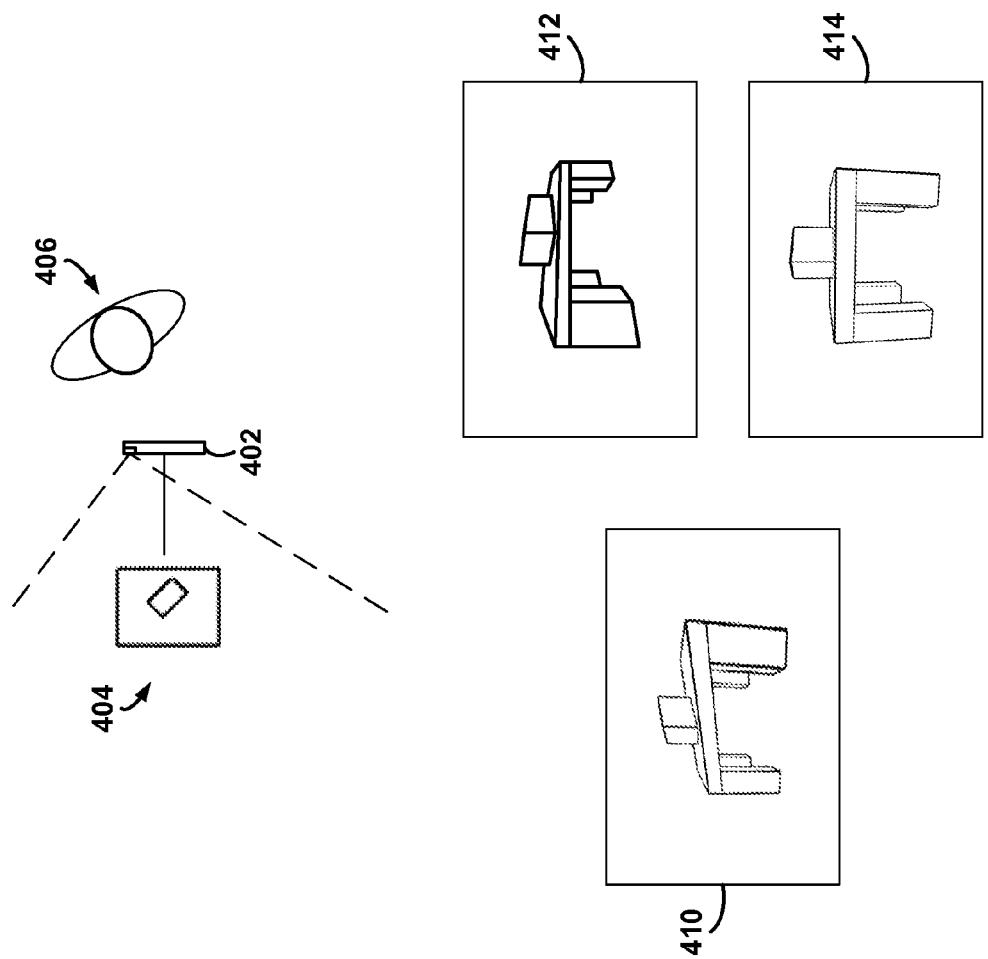
FIGS. 4A-4C are example conceptual illustrations of viewpoint positions and rendered images.
Figure 4A:
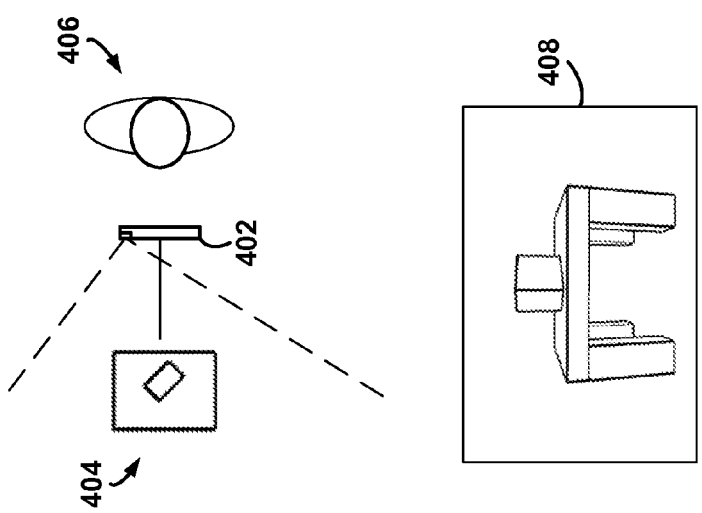
Figure 4C:
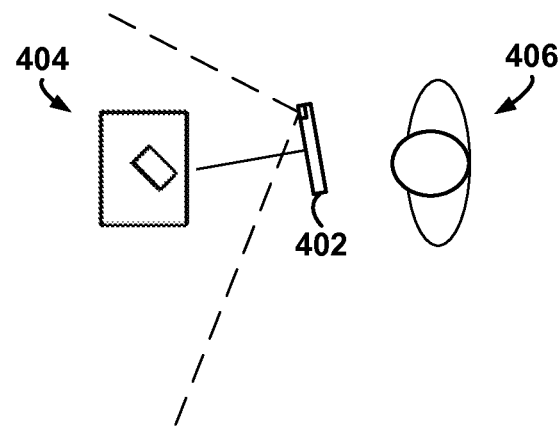

As described previously, images of recognized objects in the environment may be rendered based on a viewpoint position from which the display of the mobile device is viewed. For example, the viewpoint position may be a position from which a user holding the mobile device 302 is viewing the display. FIGS. 4A-4C are example conceptual illustrations of viewpoint positions and rendered images. As shown in FIGS. 4A-4C, a mobile device 402 may render images of objects 404 visible within a field of view of the mobile device 402 based on a viewpoint position from which a display of the mobile device 402 is viewed. For simplicity, the conceptual illustrations presented in FIGS. 4A-4C will be described with the assumption that the mobile device is at eye-level of a user 406. However, in other examples, the position of the mobile device 402 may be above or below the eye-level of the user 406.

As shown in FIG. 4A, a first viewpoint position may be normal to a surface of a display of the mobile device 402. Thus, the objects 404 may have the same perspective when viewed from the position of the mobile device 402 and the first viewpoint position. A rendered image 408 of the objects 404 may have a given perspective as shown in the rendered image 408.

In other examples, a second viewpoint position may be offset or not normal to the surface of the display of the mobile device 402. As shown in FIG. 4B, the user 406 may be observing the display of the mobile device 402 from an angle that is offset from the first viewpoint position normal to the surface of the display. The rendered image 410 illustrates a perspective of a rendered image of the objects 404 when the rendered image 408 is provided on the mobile device 402 and viewed from the second viewpoint position. The rendered image 410 is visibly skewed and the distorted perspective of the objects 404 gives the effect to the user that the objects 404 are slanted or squashed.

In one example, if the second viewpoint position is known relative to the position and orientation of the mobile device 402, an image of the objects 404 rendered on the display of the mobile device 402 may be rendered with a perspective such that the objects 404 appear in the correct perspective when the display is viewed from the second viewpoint position. The rendered image 412 shows an example of a perspective that the objects 404 may have when rendered on the display. Anamorphosis describes how an image with a distorted perspective, such as the rendered image 412, may enable a viewer to reconstruct an image having the proper perspective when viewed from a specific vantage point or viewpoint position. Given the second viewpoint position, the position of the mobile device 402, and a 3D model of the objects 404, the rendered image 412 may be created. The rendered image 414 shows how the rendered image 412 may look when the rendered image 412 is provided on the mobile device 402 and viewed from the second viewpoint position.

In one instance, the rendered image 412 may be determined by orbiting a viewpoint of the 2D rendered image 408 to simulate viewing the rendered image 408 from the second viewpoint position. This change in viewpoint results in the rendered image 410. It can be shown that flipping the rendered image 410 horizontally produces the rendered image 412 which, when observed from the second viewpoint position, gives the correct perspective of the objects 404. Similarly, the rendered image 412 may be determined by orbiting the viewpoint of the 2D rendered image 408 by the same amount in the opposite orbiting direction.

As shown in FIG. 4C, a viewpoint position may also be changed due to tilting of the mobile device 402. In an instance in which the perspective of a rendered image of the objects 404 does not change based on the viewpoint position, the perspective of the rendered image will not be correct when the mobile device is tilted or waggled. However, by determining the correct perspective for images of the objects 404 to be rendered in on the mobile device 402 based on the viewpoint position, the rendered images presented on the mobile device may create the effect that the mobile device 402 is a transparent piece of glass which the user 406 is looking through (as opposed to a scenario in which a perspective of a fixed rendered image of the objects 404 becomes distorted when the mobile device is tilted).

Figure 5C:
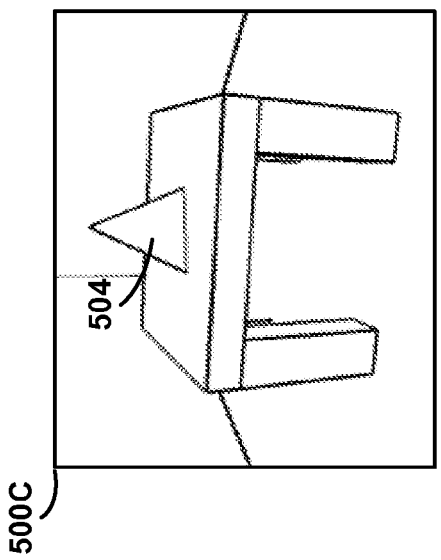
FIGS. 5A-5C are example conceptual illustrations of virtual views of three-dimensional (3D) objects superimposed with live images.
Figure 5B:
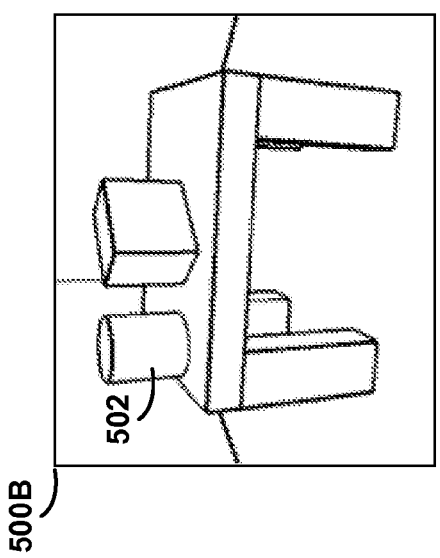
Figure 5A:
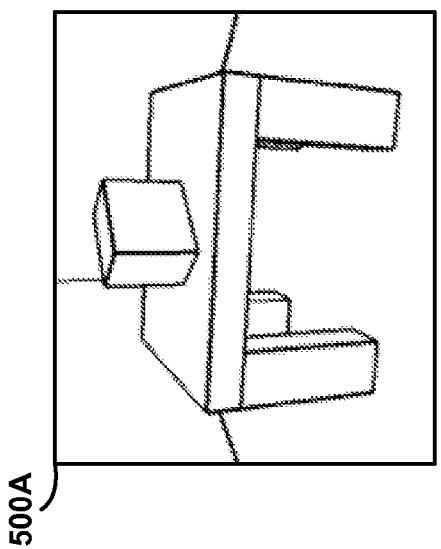

FIGS. 5A-5C are example conceptual illustrations of virtual views of three-dimensional (3D) objects superimposed with live images. In the example illustrations of FIGS. 5A-5C, a desk and a cube have been recognized, and 2D rendered images of virtual views of the desk and the cube have been superimposed over a live image of the environment. The example conceptual illustrations provided in FIGS. 5A-5C may be applicable to rendered images with a fixed perspective (that does not change based on a viewpoint position) or moving rendered images whose perspective is based on a viewpoint position.

As shown in FIG. 5A, the example illustration 500A may include rendered images of recognized objects displayed composited with a live image of a room in which the recognized objects exist. In some examples, 3D geometry information for an environment may include information indicative of a scale of the environment or objects in the environment. Given the scale of the environment and a database of 3D models of objects having known dimensions, rendered images of virtual objects having an appropriate scale and representing objects absent from the environment may also be superimposed with the live image of the environment. As shown in FIG. 5B, the example illustration 500B may include a virtual object 502. The virtual object 502 may be superimposed at a given 3D position within the environment.

In some instances, the virtual object 502 may include an occlusion model describing a profile or silhouette that may occlude other objects when viewed from various perspectives. For example, the occlusion model may describe attenuation of light and approximate the way light radiates throughout an environment. Based on an occlusion model for the virtual object 502, surfaces of the virtual object 502 or other recognized objects may be hidden from a given viewpoint position. When rendered images of the virtual object 502 and other objects are composited with the live image, the hidden surfaces may be removed.

As an example, a tennis ball may be added to an environment. A rendered image of the tennis ball may be visible on the mobile device. If the tennis ball rolls behind the desk, the tennis ball may be occluded until the viewpoint position or position of the mobile device is varied such that a user can see behind the desk. For example, a user may squat down so that they can see under the desk through the mobile device, and the tennis ball may appear on the live image. In another example, a user may add a virtual bookcase or other piece of furniture to an environment to see how it may look if added to the environment.

In other instances, a given virtual object may replace a recognized object in the environment. For example, as shown in the conceptual illustration 500C of FIG. 5C, the virtual object 504 may replace a rendered image of the recognized cube that is actually on top of the desk in the environment.

Figure 6:
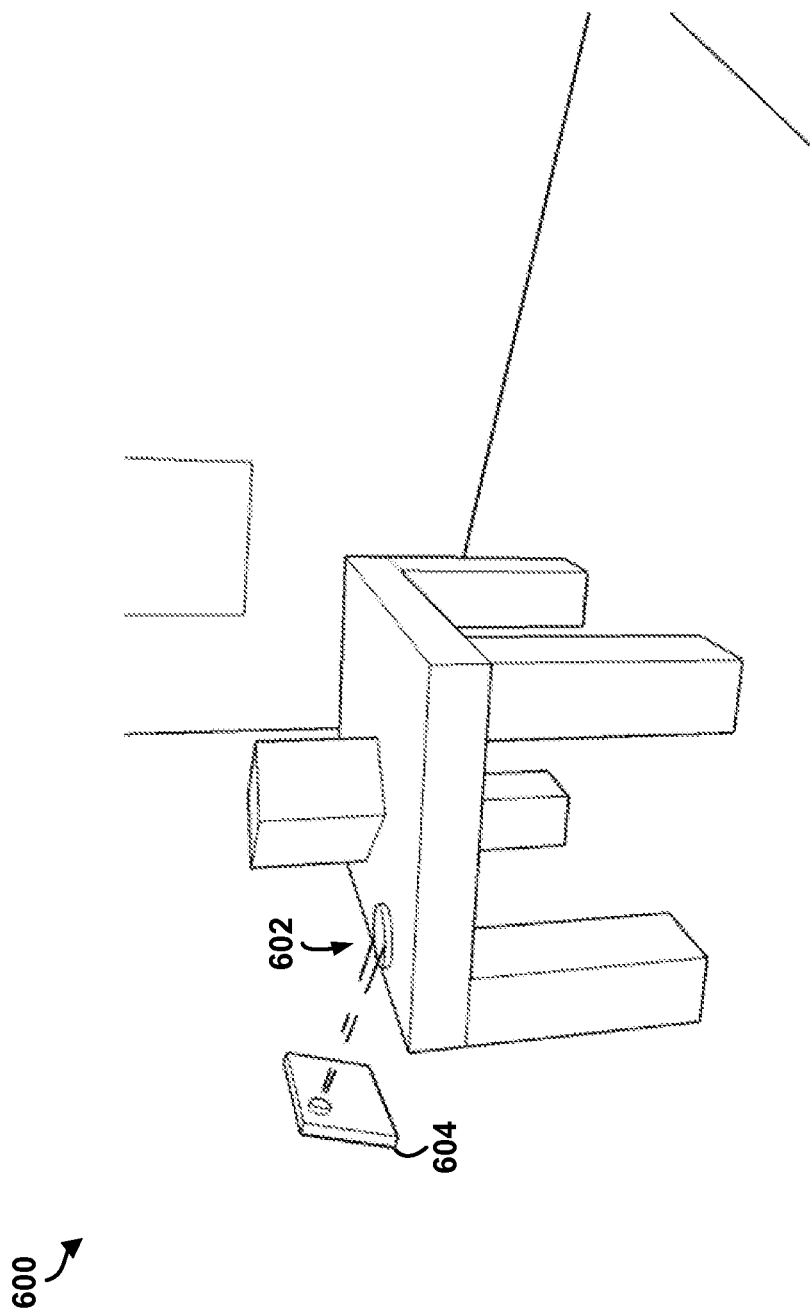
FIG. 6 is an example conceptual illustration of projecting a rendered image of a virtual object.

In still another example, a projector of a mobile device may be used to project an image of a virtual object onto an environment. FIG. 6 is an example conceptual illustration 600 of projecting a rendered image of a virtual object 602. For example, a surface of a desk may be recognized within an environment. Based on a determined position and orientation of a mobile device 604, a projector such as a handheld projector, mobile projector, or pico projector may be used to project a 2D image of the virtual object 602 onto the physical surface of the desk. A rendered image of the virtual object 602 may optionally also be superimposed with a live image of the desk displayed on the mobile device 604.

Given the ability to superimpose rendered images of virtual objects having an appropriate scale and dimension into a live image of an environment and/or project rendered images of virtual objects onto an environment, various additional applications are contemplated. In one example, virtual objects may react and interact with each other. For example, a pointing object such as a user's hand or other input device can apply a force to a virtual object, and a computer game physics model can solve for how 3D models of the virtual objects would interact and move. In one example, the user's hand may be recognized and tracked in a field of view of the mobile device using 3D geometry information. In another example, the user's hand may be tracked using a special glove or wearable computing device which communicates a position of the user's hand to the mobile device.

As an example, a mobile device may display a live image of a pool hall. The live image may include virtual pool balls on the table. As a pointing object collides with a position of a first virtual pool ball, the first virtual pool ball may be placed into motion. Based on a simulated force applied to the first virtual pool ball by the collision of the pointing object with the position of the first ball, movement information for the first virtual pool ball may be determined. A computer game physics model may introduce the laws of physics into a simulation engine to determine movement information for the first virtual pool ball and other virtual pool balls based on contact of the first virtual pool ball with the other virtual pool balls. For example, the computer game physics model may perform collision detection for the virtual pool balls. In some instances, the rendered images of the virtual objects that are superimposed on the live image of the environment may be updated in real-time to include the movement of the virtual objects.

In another example, recognized objects of an environment may interact with virtual objects based on physical properties of the recognized objects and virtual objects. As an example, a virtual tennis ball may be bouncing on a surface of an environment. As the position of the tennis ball varies such that the tennis ball falls over a surface a recognition component has recognized as a pool, the tennis ball may sink or bob in the water instead of continuing to bounce.

In still another example, user interface events may be attached to physics events in the environment. For example, a projector may render an image of a virtual button into a position in the environment. As a position of a pointing object intersects or collides with a virtual position of the virtual button, a user interface event (e.g., a click, keypress, etc.) may be registered and the mobile device may be controlled based on the user interface event.

Figure 7:
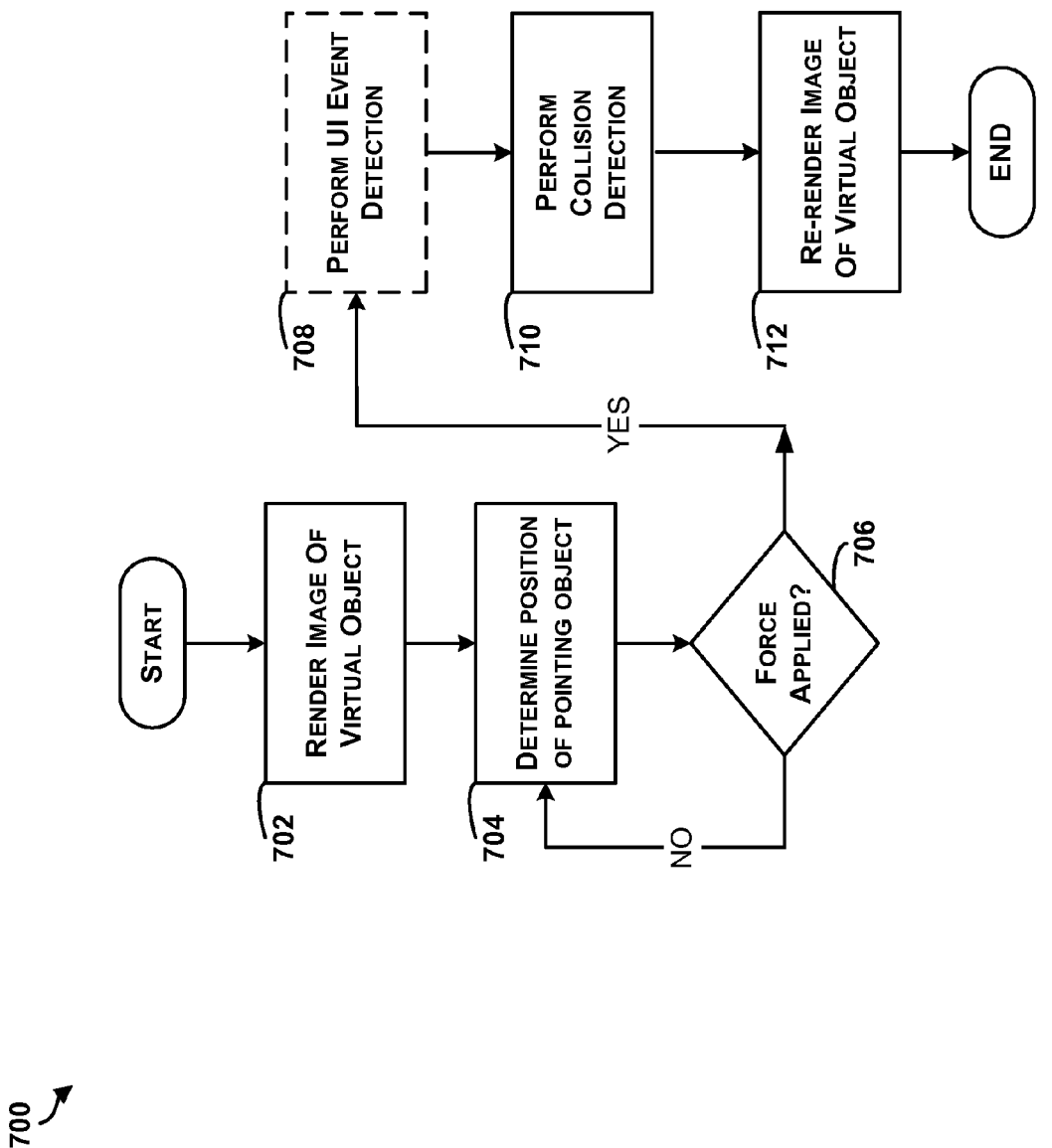
FIG. 7 is an example flow chart for rendering an image of a virtual object.

With respect to FIG. 7, an example flow chart 700 for rendering an image of a virtual object is described. The flow chart 700 may describe one example implementation for rendering an image of a virtual object and performing user interface event detection or collision detection as described above.

Initially, at block 702, an image of a virtual object may be rendered. For instance, the image of the virtual object may be composited with a live image on a mobile device. Optionally, a projector may also be used to project the rendered image onto an environment. At block 704, a position of a pointing object may be determined. The position may be determined at fixed intervals and stored in a database. In one example, the pointing object may be a user's hand and a wearable glove may be used to determine the position. In another example, the pointing object may be a wireless mouse or other type of input device having an accelerometer or gyroscope that is used for determining the position.

At block 706, a determination may be made whether a force is or has been applied to the virtual object. For instance, if the position determined at block 704 intersects the position of the virtual object or is within a threshold distance of the position of the virtual object, a determination may be made that a force has been applied to the virtual object. Additionally, in some instances, an amount of force applied to the object may be determined based on a change in position of the pointing object over time (e.g., a velocity), or a change in velocity of the pointing object over time (e.g., an acceleration). For example, at block 704, a velocity and or acceleration may be determined for the pointing object.

If the position of the pointing object that is determined at block 704 does not intersect with the position of the virtual object or fall within a threshold of the position of the virtual object, a determination may be made that a force has not been applied to the virtual object. If a determination is made that a force has not been applied, the position of the pointing object may again be determined at block 704. If a determination is made that a force has been applied to the virtual object, optionally, at block 708 user interface event detection may be performed. For example, if the virtual object is a virtual button, an intersection of the position of the pointing object with the position of the virtual button may be registered as a user interface event (e.g., a click or selection) and used to control the behavior of a mobile device or other device coupled to a mobile device.

At block 710, collision detection may be performed. For instance, a computer game physics model may be used to determine movement of the virtual object in response to the applied force. In one example, the pointing object may be used to control the position of a virtual pool cue while the virtual object is a pool ball. If the pointing object is manipulated such that the virtual cue impacts the virtual pool ball, the computer game physics model may be used to determine a new position of the virtual object. Based on the new position, at block 712, an image of the virtual object may be re-rendered. For instance, the image rendered at block 702 may be replaced with a new image to indicate movement of the virtual object in response to the applied force.

Figure 8:
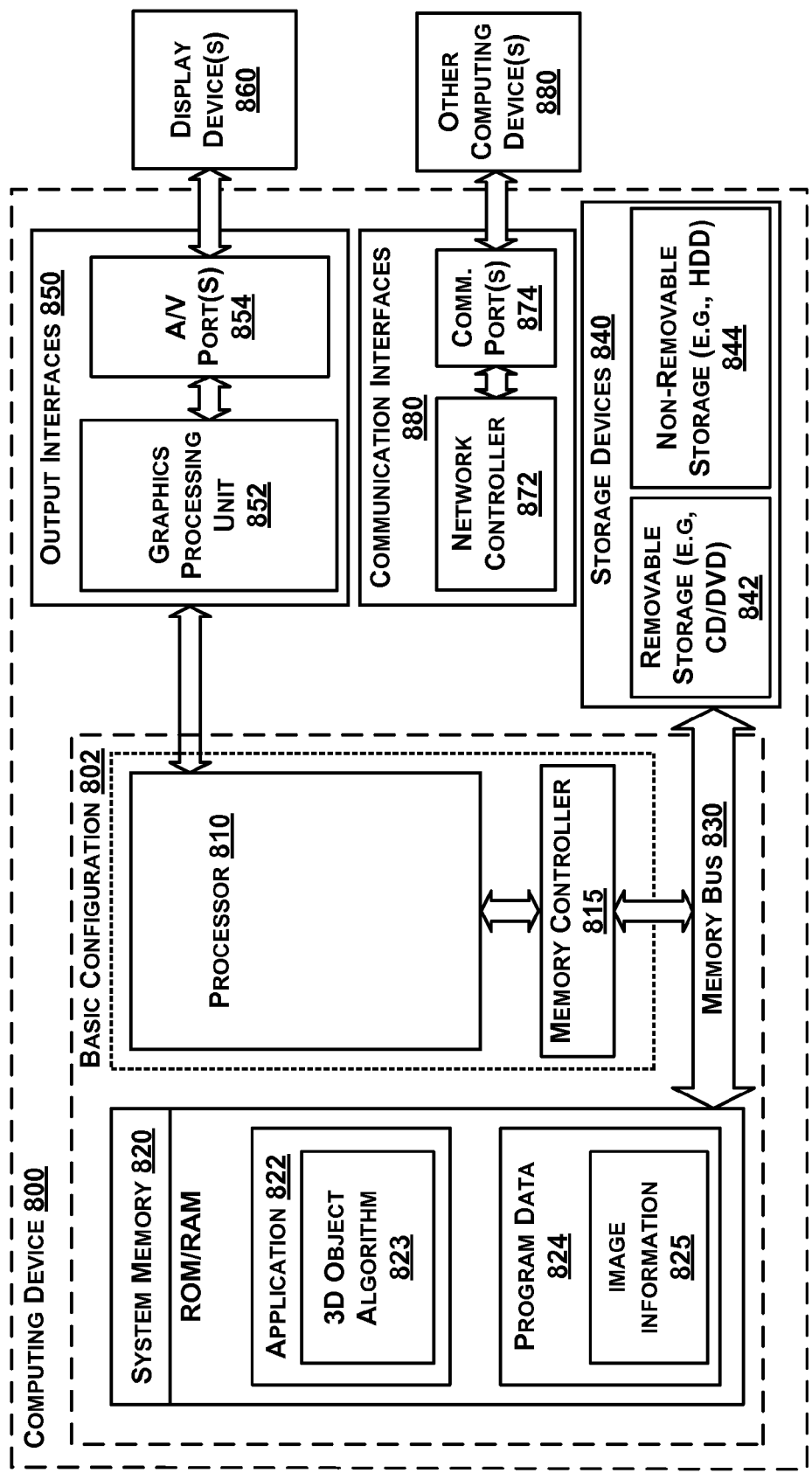
FIG. 8 is a functional block diagram illustrating an example computing device used in a computing system that is arranged in accordance with at least some embodiments described herein.

Any of the blocks of the example flow chart 700, as well as any of the other functions described above, may be performed by a computing device. FIG. 8 is a functional block diagram illustrating an example computing device 800 used in a computing system that is arranged in accordance with at least some embodiments described herein. The computing device 800 may be a personal computer, mobile device, cellular phone, touch-sensitive wristwatch, tablet computer, video game system, or global positioning system, and may be implemented to provide a system for superimposing virtual views of 3D objects with live images as described in FIGS. 1-7. In a basic configuration 802, computing device 800 may typically include one or more processors 810 and system memory 820. A memory bus 830 can be used for communicating between the processor 810 and the system memory 820. Depending on the desired configuration, processor 810 can be of any type including but not limited to a microprocessor (µP), a microcontroller (µC), a digital signal processor (DSP), or any combination thereof. A memory controller 815 can also be used with the processor 810, or in some implementations, the memory controller 815 can be an internal part of the processor 810.

Depending on the desired configuration, the system memory 820 can be of any type including but not limited to volatile memory (such as RAM), non-volatile memory (such as ROM, flash memory, etc.) or any combination thereof. System memory 820 may include one or more applications 822, and program data 824. Application 822 may include a 3D object algorithm 823 that is arranged to provide inputs to the electronic circuits, in accordance with the present disclosure. Program data 824 may include image information 825 that could be directed to any number of types of data. In some example embodiments, application 822 can be arranged to operate with program data 824 on an operating system.

Computing device 800 can have additional features or functionality, and additional interfaces to facilitate communications between the basic configuration 802 and any devices and interfaces. For example, data storage devices 840 can be provided including removable storage devices 842, non-removable storage devices 844, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer readable instructions, data structures, program modules, or other data.

System memory 820 and storage devices 840 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media can be part of device 800.

Computing device 800 can also include output interfaces 850 that may include a graphics processing unit 852, which can be configured to communicate to various external devices such as display devices 860 or speakers via one or more A/V ports or a communication interface 870. The communication interface 870 may include a network controller 872, which can be arranged to facilitate communications with one or more other computing devices 880 over a network communication via one or more communication ports 874. The communication connection is one example of a communication media. Communication media may be embodied by computer readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

Computing device 800 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 800 can also be implemented as a personal computer including both laptop computer and non-laptop computer configurations.

In some embodiments, the disclosed methods may be implemented as computer program instructions encoded on a non-transitory computer-readable storage media in a machine-readable format, or on other non-transitory media or articles of manufacture. FIG. 9 is a schematic illustrating a conceptual partial view of an example computer program product 900 that includes a computer program for executing a computer process on a computing device, arranged according to at least some embodiments presented herein.

In one embodiment, the example computer program product 900 is provided using a signal bearing medium 901. The signal bearing medium 901 may include one or more programming instructions 902 that, when executed by one or more processors may provide functionality or portions of the functionality described above with respect to FIGS. 1-8. In some examples, the signal bearing medium 901 may encompass a computer-readable medium 903, such as, but not limited to, a hard disk drive, a Compact Disc (CD), a Digital Video Disk (DVD), a digital tape, memory, etc. In some implementations, the signal bearing medium 901 may encompass a computer recordable medium 904, such as, but not limited to, memory, read/write (R/W) CDs, R/W DVDs, etc. In some implementations, the signal bearing medium 901 may encompass a communications medium 905, such as, but not limited to, a digital and/or an analog communication medium (e.g., a fiber optic cable, a waveguide, a wired communications link, a wireless communication link, etc.). Thus, for example, the signal bearing medium 901 may be conveyed by a wireless form of the communications medium 905 (e.g., a wireless communications medium conforming with the IEEE 802.11 standard or other transmission protocol).

The one or more programming instructions 902 may be, for example, computer executable and/or logic implemented instructions. In some examples, a computing device such as the computing device 800 of FIG. 8 may be configured to provide various operations, functions, or actions in response to the programming instructions 902 conveyed to the computing device 700 by one or more of the computer readable medium 903, the computer recordable medium 904, and/or the communications medium 905.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
    determining three-dimensional (3D) geometry information for one or more physical objects in a physical environment using one or more sensors of a mobile device;
    recognizing 3D objects in the physical environment based on a comparison of the 3D geometry information for the one or more physical objects with 3D objects stored in a database of 3D objects;
    determining a field of view of the physical environment based on a position of the mobile device in the physical environment;
    determining a viewpoint position from which a display of the mobile device is viewed, wherein the viewpoint position is offset from normal to a surface of the display;
    determining a gaze direction from the viewpoint position to the display of the mobile device, wherein the gaze direction is indicative of an angle by which the viewpoint position is offset from a position that is normal to the surface of the display;
    rendering an image of one or more of the recognized 3D objects that are within the field of view, wherein the rendered image has a given perspective that is based on the position of the mobile device and the gaze direction from the viewpoint position to the display of the mobile device; and
    combining the rendered image with a live image of the field of view that is presented by the mobile device.

2. The method of claim 1, further comprising:
determining a scale of the physical environment; and
rendering the image of the one or more of the 3D objects having a size that is determined based on the scale of the physical environment.

3. The method of claim 1, wherein one or more of the position of the mobile device and the viewpoint position vary, and the method further comprising repeatedly:
determining the position of the mobile device and the viewpoint position;
determining the field of view of the physical environment based on the position of the mobile device;
rendering the image of the one or more of the 3D objects within the field of view based on the viewpoint position; and
combining the rendered image with the live image of the field of view.

4. The method of claim 1, further comprising:
rendering a second image of a virtual 3D object that represents an object absent from the physical environment, wherein the second image has the given perspective; and
combining the second image and the image with the live image of the field of view.

5. The method of claim 4, further comprising:
determining which surfaces of the virtual 3D object and the one or more of the 3D objects are hidden from the viewpoint position based on occlusion models for the virtual object and the one or more of the 3D objects; and
removing the hidden surfaces from the image and the second image.

6. The method of claim 5, further comprising:
projecting the second image of the virtual 3D object onto the physical environment.

7. The method of claim 5, wherein the virtual 3D object replaces a given image of the image of the one or more of the 3D objects.

8. The method of claim 5, further comprising:
determining a force applied to the virtual 3D object;
determining movement information for the virtual 3D object based on the applied force; and
rendering the second image of the virtual 3D object based on the movement information.

9. The method of claim 8, further comprising:
determining a position of a pointing object, wherein the force applied to the virtual 3D object is determined based on the position of the pointing object.

10. The method of claim 9, further comprising:
determining a user interface event based on the force applied to the virtual 3D object; and
controlling the mobile device based on the user interface event.

11. The method of claim 8, further comprising:
determining an interaction between the virtual 3D object and the one or more of the 3D objects based on physical properties of the virtual 3D object and the one or more of the 3D objects; and
rendering the second image and the image based on the interaction.

12. The method of claim 1, wherein combining the rendered image with a live image of the field of view comprises compositing the rendered images onto the live image of the field of view.

13. A non-transitory computer-readable medium having stored therein instructions executable by a computing device to cause the computing device to perform functions comprising:
determining three-dimensional (3D) geometry information for one or more physical objects in a physical environment using one or more sensors of a mobile device;
recognizing 3D objects in the physical environment based on a comparison of the 3D geometry information for the one or more physical objects with 3D objects stored in a database of 3D objects;
determining a field of view of the physical environment based on a position of the mobile device in the physical environment;
determining a viewpoint position from which a display of the mobile device is viewed, wherein the viewpoint position is offset from normal to a surface of the display;
determining a gaze direction from the viewpoint position to the display of the mobile device, wherein the gaze direction is indicative of an angle by which the viewpoint position is offset from a position that is normal to the surface of the display;
rendering an image of one or more of the recognized 3D objects that are within the field of view, wherein the rendered image has a given perspective that is based on the position of the mobile device and the gaze direction from the viewpoint position to the display of the mobile device; and
combining the rendered image with a live image of the field of view that is presented by the mobile device.

14. The non-transitory computer-readable medium of claim 13, further comprising instructions executable by the computing device to cause the computing device to perform functions comprising:
determining a scale of the physical environment; and
rendering the image of the one or more of the 3D objects having a size that is determined based on the scale of the physical environment.

15. The non-transitory computer-readable medium of claim 13, further comprising instructions executable by the computing device to cause the computing device to perform functions comprising:
rendering a second image of a virtual 3D object that represents an object absent from the physical environment, wherein the second image has the given perspective; and
combining the second image and the image with the live image of the field of view.

16. The non-transitory computer-readable medium of claim 15, further comprising instructions executable by the computing device to cause the computing device to perform functions comprising:
projecting the second image of the virtual 3D object onto the physical environment.

17. The non-transitory computer-readable medium of claim 15, further comprising instructions executable by the computing device to cause the computing device to perform functions comprising:
determining a force applied to the virtual 3D object;
determining movement information for the virtual 3D object based on the applied force; and
rendering the second image of the virtual 3D object based on the movement information.

18. A system comprising:
a mobile device having a display;
a geometry component, the geometry component configured to determine three-dimensional (3D) geometry information for one or more physical objects in a physical environment using one or more sensors of the mobile device;
a recognition component, the recognition component configured to recognize 3D objects in the physical environment based on a comparison of the 3D geometry information for the one or more physical objects with 3D objects stored in a database of 3D;

a position component, the position component configured to determine a field of view of the physical environment based on a position of the mobile device in the physical environment;

at least one sensor, the at least one sensor configured to determine: (1) a viewpoint position from which a display of the mobile device is viewed, wherein the viewpoint position is offset from normal to a surface of the display, and (2) a gaze direction from the viewpoint position to the display of the mobile device, wherein the gaze direction is indicative of an angle by which the viewpoint position is offset from a position that is normal to the surface of the display;

a rendering component, the rendering component configured to render an image of one or more of the recognized 3D objects that are within the field of view, wherein the rendered image has a given perspective that is based on the position of the mobile device and the gaze direction from the viewpoint position to the display of the mobile device; and a presentation component, the presentation component configured to combine the rendered image with a live image of the field of view that is presented by the mobile device.

19. The system of claim 18:

wherein the rendering component is further configured to render a second image of a virtual 3D object that represents an object absent from the physical environment, wherein the second image has the given perspective; and wherein the presentation component is further configured to combine the rendered second image with the live image of the field of view.

20. The system of claim 19, further comprising a projection component, wherein the projection component is configured to project the second image of the virtual 3D object onto the physical environment.

21. The system of claim 20, further comprising a physics component, wherein the physics component is configured to:

determine a position of a pointing object; and determine a force applied to the virtual 3D object based on the position of the pointing object.

22. The system of claim 21, wherein the physics component is further configured to:

determine movement information for the virtual 3D object based on the applied force; and determine an interaction between the virtual 3D object and the one or more of the 3D objects based on physical properties of the virtual 3D object and the one or more of the 3D objects.

* * * * *